US008823778B2

(12) United States Patent
Endo (10) Patent No.: US 8,823,778 B2
(45) Date of Patent: Sep. 2, 2014

(54) IMAGING DEVICE AND IMAGING METHOD (71) Applicant: FUJIFILM Corporation, Tokyo (JP)

(72) Inventor: Hiroshi Endo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/956,846

(22) Filed: Aug. 1, 2013

(65) Prior Publication Data
US 2013/0314510 A1    Nov. 28, 2013

Related U.S. Application Data (63) Continuation of application No. PCT/JP2011/078649, filed on Dec. 12, 2011.

(30) Foreign Application Priority Data

Feb. 9, 2011   (JP) ................. 2011-026429

(51) Int. Cl.
*H04N 13/02*  (2006.01)
*H04N 13/00*  (2006.01)
*G03B 35/08*  (2006.01)

(52) U.S. Cl.
CPC ....... *H04N 13/0207* (2013.01); *H04N 13/0296* (2013.01); *H04N 13/0018* (2013.01); *H04N 13/0217* (2013.01); *H04N 13/0257* (2013.01); *G03B 35/08* (2013.01)
USPC .......................................... 348/49

(58) Field of Classification Search
CPC ................. H04N 13/026; H04N 13/0207
See application file for complete search history.

(56) References Cited

U.S. PATENT DOCUMENTS

| 6,233,003 | B1 | 5/2001 | Ono | |
|---|---|---|---|---|
| 6,807,295 | B1 | 10/2004 | Ono | |
| 2001/0045979 | A1 | 11/2001 | Matsumoto et al. | |
| 2003/0071905 | A1* | 4/2003 | Yamasaki | 348/239 |
| 2004/0208357 | A1* | 10/2004 | Tokuhashi et al. | 382/154 |
| 2005/0159641 | A1* | 7/2005 | Kanai | 600/101 |
| 2005/0264881 | A1* | 12/2005 | Takagi et al. | 359/463 |
| 2007/0189637 | A1* | 8/2007 | Rohaly | 382/278 |
| 2008/0259172 | A1 | 10/2008 | Tamaru | |
| 2008/0273773 | A1* | 11/2008 | Ernst et al. | 382/128 |

(Continued)

FOREIGN PATENT DOCUMENTS

| JP | 8-331607 A | 12/1996 |
|---|---|---|
| JP | 10-42314 A | 2/1998 |

(Continued)

*Primary Examiner* — Sath V Perungavoor
*Assistant Examiner* — Kate Luo
(74) *Attorney, Agent, or Firm* — Birch, Stewart, Kolasch & Birch, LLP (57) ABSTRACT An imaging device, comprising: a single imaging optical system; an imaging unit; a diaphragm unit; a diaphragm control unit; an imaging control unit; a parallax information calculation unit configured to calculate parallax information based on the pair of viewpoint images outputted from the imaging unit at the first point or points of time; a plane image generation unit configured to generate a plane image based on the pair of viewpoint images outputted from the imaging unit at the second point of time; and a blurring processing unit configured to determine target pixels in the plane image which are to be subjected to blurring processing, based on the parallax information calculated by the parallax information calculation unit, and to perform blurring processing on the determined target pixels in the plane image.

11 Claims, 7 Drawing Sheets

(56) References Cited

U.S. PATENT DOCUMENTS

| | | |
|---|---|---|
| 2009/0052739 A1* | 2/2009 | Takahashi et al. ............ 382/103 |
| 2010/0074594 A1* | 3/2010 | Nakamura et al. ............ 386/92 |
| 2011/0037835 A1* | 2/2011 | Morino et al. ................. 348/51 |

FOREIGN PATENT DOCUMENTS

| | | |
|---|---|---|
| JP | 2000-102040 A | 4/2000 |
| JP | 2001-12916 A | 1/2001 |
| JP | 2001-16611 A | 1/2001 |
| JP | 2003-7994 A | 1/2003 |
| JP | 2003-209727 A | 7/2003 |
| JP | 2006-105771 A | 4/2006 |
| JP | 2007-104248 A | 4/2007 |
| JP | 2008-92007 A | 4/2008 |
| JP | 2008-116309 A | 5/2008 |
| JP | 2008-141666 A | 6/2008 |
| JP | 2008-271241 A | 11/2008 |
| JP | 2009-14445 A | 1/2009 |
| JP | 2009-124308 A | 6/2009 |
| JP | 2010-226500 A | 10/2010 |
| JP | 2011-215498 A | 10/2011 |

* cited by examiner

GENERAL PIXEL (A)

MICRO LENS L   PHOTO DIODE PD

PHASE DIFFERENCE PIXEL (B)

IMAGING DEVICE AND IMAGING METHOD

CROSS-REFERENCE TO RELATED APPLICATIONS

This application is a continuation application and claims the priority benefit under 35 U.S.C. §120 of PCT Application No. PCT/P2011/078649 filed on Dec. 12, 2011 which application designates the U.S., and also claims the priority benefit under 35 U.S.C. §119 of Japanese Patent Application No. 2011-026429 filed on Feb. 9, 2011, which applications are all hereby incorporated by reference in their entireties.

BACKGROUND OF THE INVENTION

1. Field of the Invention

The present invention relates to an imaging device and an imaging method for forming subject images on an image sensor, which have respectively passed through different areas of a photographic lens in two directions, to acquire different viewpoint images. The present invention is more particularly relates to an imaging device and an imaging method for stereoscopically displaying a photographing angle of view of an image having parallax as a through image.

2. Description of the Related Art

Conventionally, there has been a stereoscopic imaging device configured to form subject images, which have respectively passed through different areas of a photographic lens in two directions, on an image sensor to acquire different viewpoint images.

Figure 7:
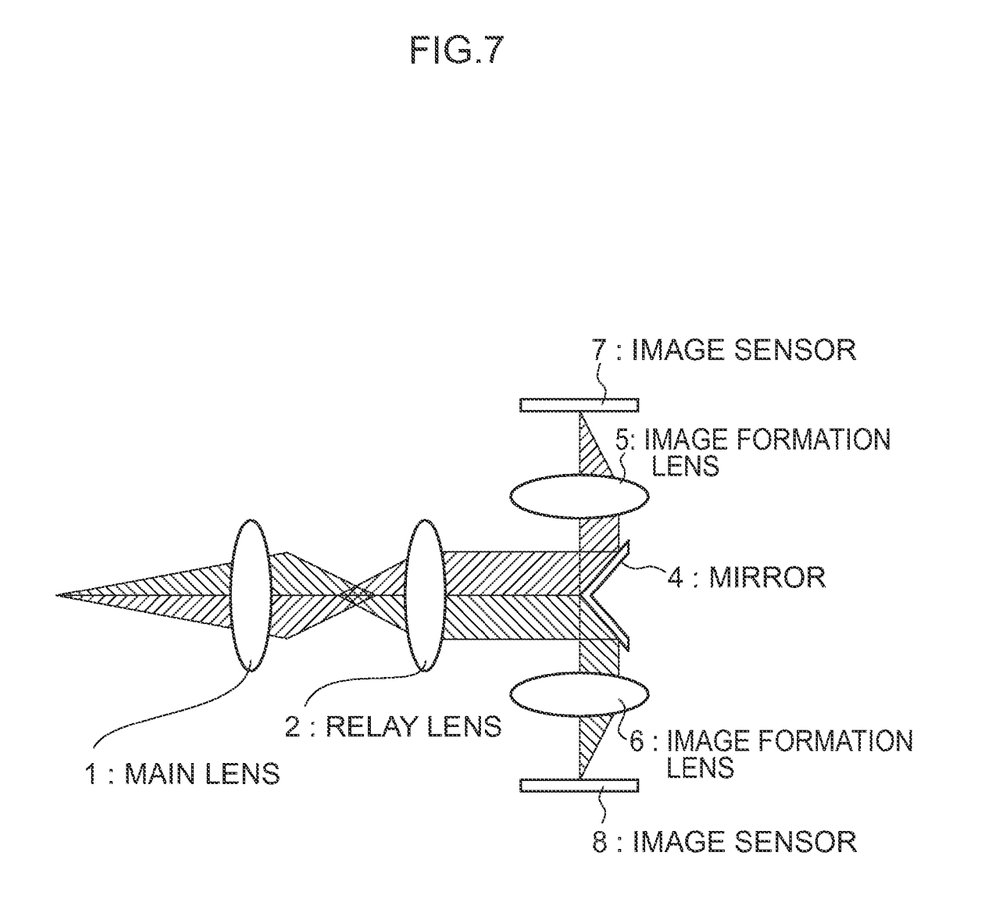
FIG. 7 is a view showing one example of a conventional monocular stereoscopic imaging device.

An optical system shown in FIG. 7 is configured to cause a mirror 4 to pupil-divide subject images that have passed through different horizontal areas of a main lens 1 and a relay lens 2, and to form the respective subject images on image sensors 7 and 8 through image formation lenses 5 and 6.

Figure 8:
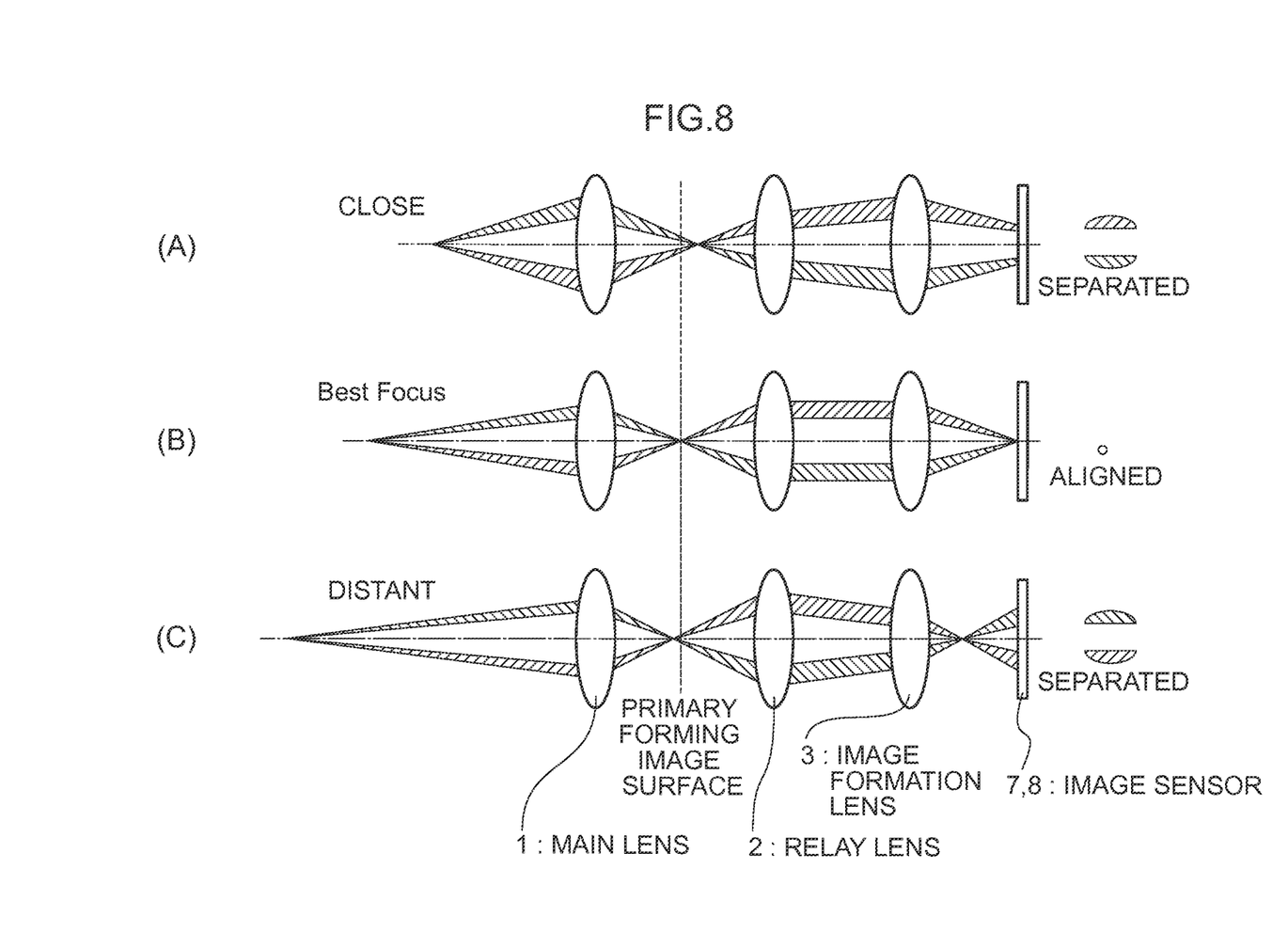
FIG. 8 is a view showing the state of separation of an image formed on an image sensor.

(A) to (C) portions of FIG. 8 are views showing the state of separation of images formed on the image sensor in the case of front focus, in-focus (best focus), and rear focus states. Note that in FIG. 8, the mirror 4 shown in FIG. 7 is omitted in order to compare differences in image separation depending on the focus states.

Among the pupil-divided images, the in-focus images are formed at the same position (are aligned) on the image sensor as shown in (B) portion of FIG. 8, whereas the front-focus and rear-focus images are formed at different positions (are separated) on the image sensor as shown in (A) and (C) portions of FIG. 8.

Therefore, by acquiring subject images which have been pupil-divided in the horizontal direction through the image sensors 7 and 8, it becomes possible to acquire a left viewpoint image and aright viewpoint image (3D image) having different viewpoints depending on subject distances.

According to Japanese Patent Application Laid-Open No. 2007-104248, an electronic camera has an imaging unit, a light amount distribution detection unit, an image shift amount detection unit, and an image processing unit. The imaging unit is configured to photoelectrically convert a subject image obtained by the photographing optical system to generate photographed image data. The light amount distribution detection unit detects respective light amount distributions of luminous fluxes which have come from the subject and have passed through different optical paths. The image shift amount detection unit detects an image shift amount in a plurality of points within a photographing screen based on the light amount distributions. The image processing unit is configured to change, in the horizontal direction, positional relationship of the subject in the photographed image data based on the image shift amount in the plurality of points to generate stereogram image data. The image processing unit is also configured to change, in the horizontal direction, the positional relationship of the subject in the stereogram image data based on an input from an input unit to correct the stereogram image data. Since the stereogram image data can be corrected, it becomes possible to acquire a natural stereogram image, which causes less discomfort for users.

Japanese Patent Application Laid-Open No. 2009-124308 discloses a method for generating a multi-viewpoint image, including: performing pattern matching between left-eye and right-eye stereo images photographed with two cameras on the left side and right side, using one of the stereo images as reference; specifying a matched image for each pixel; calculating an intermediate position image by interpolating an interpixel distance between images matched for each of the left and right pixels; and calculating a right outer image and a left outer image by extrapolating the interpixel distance between the images matched for each of the left and right pixels.

In Japanese Patent Application Laid-Open No. 2008-92007, paragraphs 0047 to 0048, and 0071, a stereo matching processing unit (object detection means) 13 detects one or more corresponding points (objects) corresponding to each other in search spaces set by the aforementioned space setting unit 42 in two pieces of image data A and B which have been each processed by image processing units 4A and 4B and stored in a memory section 31. A distance calculation unit (position calculation means) 44 calculates three-dimensional coordinate values (position information) of the corresponding points detected by the above-stated stereo matching processing unit 83. Photographic lenses 21A2 and 21B2 in photographing units 20A and 20B are different in configuration. The photographic lens 21A2 includes a zoom lens and an unshown zoom lens driving unit (driving means) that drives the zoom lens, while the photographic lens 21B2 includes a fixed-focus lens with an angle of view equal to a wide angle end of the zoom lens of the photographic lens 21A2. Such configuration is employed to achieve cost reduction.

Japanese Patent Application Laid-Open No. 2003-7994, Japanese Patent Application Laid-Open No. 2001-12916, and Japanese Patent Application Laid-Open No. 2001-016611 are examples of a three-dimensional image generation technology with use of a single optical system. For example, Japanese Patent Application Laid-Open No. 2003-7994 discloses a solid-state image sensor configured to include a large number of pixels arrayed on the same imaging surface and to photoelectrically convert a subject image formed on the imaging surface so as to generate an image signal. In the solid-state image sensor, the large number of pixels is divided into two groups, and pixels in the respective groups are made to have different light incident angles.

Japanese Patent Application Laid-Open No. 08-331607, Japanese Patent Application Laid-Open No. 2008-141666, Japanese Patent Application Laid-Open No. 2009-14445, Japanese Patent Application Laid-Open No. 2008-116309, and Japanese Patent Application Laid-Open No. 2000-102040 disclose examples of a method for searching corresponding points between different viewpoint images, a technology for acquiring depth information by stereo matching, and a three-dimensional image generation technology involving use of two-dimensional images and distance information (depth information).

In Japanese Patent Application Laid-Open No. 2008-271241, the focus is placed only on a main subject and portions other than the main subject are intentionally defocused. Accordingly, a plurality of images are obtained by successively photographing images while discretely moving focal positions by a predetermined moving amount, and the thus obtained images are synthesized so that a blur-emphasized image can be obtained.

In Japanese Patent Application Laid-Open No. 2003-209727, an image to be photographed is divided into a plurality of areas, and the areas, which are to be a foreground and a background of a main subject, are imaged with a focal position shifted from a focal position corresponding to a distance of the areas. Images of respective areas are individually extracted from the images imaged for each area, and these images are synthesized to form one image. This makes it possible to easily photograph an image with a desired blur amount.

Japanese Patent Application Laid-Open No. 2010-226500 shows one example of a method for generating a parallax map.

In a pupil dividing-type stereoscopic imaging device configured to image parallax images by selectively acquiring image information that have passed through different pupil positions in image formation means, to generate a stereoscopic image as in Japanese Patent Application Laid-Open No. 2003-7994, Japanese Patent Application Laid-Open No. 2001-12916, and Japanese Patent Application Laid-Open No. 2001-016611, parallax becomes 0 at the in-focus position, while at the out-of-focus position, parallax is generated corresponding to blurring (defocus amount).

Accordingly, in order to obtain a plane image without blurring in the stereoscopic imaging device, it is necessary to photograph an image with a narrowed diaphragm aperture and a deeper focus depth. However, if photographing is carried out with a narrowed diaphragm aperture, it is not possible to blur the foreground and the background in contrast to the main subject. In the pupil dividing-type stereoscopic imaging device, since photographing is carried out with a narrowed diaphragm aperture in order to obtain a clear plane image, creative image formation is limited.

The present invention provides a pupil dividing-type stereoscopic imaging device that can acquire a plane image with a desired portion, such as a foreground and a background, being blurred in contrast to a main subject, and a method for imaging plane image in the pupil dividing-type stereoscopic imaging device.

SUMMARY OF THE INVENTION

The present invention provides an imaging device, comprising: a single imaging optical system; an imaging unit capable of continuously outputting a pair of viewpoint images made up of a first image and a second image, by pupil-dividing subject images that have passed through first and second different areas in predetermined directions of the imaging optical system, and forming the respective subject images on two photoelectric conversion element groups to photoelectrically convert the respective subject images; a diaphragm unit capable of adjusting an amount of luminous flux that forms images on the photoelectric conversion element groups of the imaging unit; a diaphragm control unit capable of executing first diaphragm control that controls an open amount of the diaphragm unit so as to acquire parallax between corresponding points of the pair of viewpoint images outputted from the imaging unit at one arbitrary first point of time or a plurality of arbitrary first points of time, while executing second diaphragm control that controls the open amount of the diaphragm unit so as to be smaller than the open amount obtained by the first diaphragm control at an arbitrary second point of time that is temporally before or after the first point or points of time; an imaging control unit configured to control the imaging unit so as to output the pair of viewpoint images at the first point or points of time and the second point of time; a parallax information calculation unit configured to calculate parallax information based on the pair of viewpoint images outputted from the imaging unit at the first point or points of time; a plane image generation unit configured to generate a plane image based on the pair of viewpoint images outputted from the imaging unit at the second point of time; and a blurring processing unit configured to determine target pixels in the plane image which are to be subjected to blurring processing, based on the parallax information calculated by the parallax information calculation unit, and to perform blurring processing on the determined target pixels in the plane image.

The parallax information includes distance information of the respective pixels, and the blurring processing unit determines, as the target pixels of the plane image which are to be subjected to the blurring processing, distant view pixels, distance information of which is larger than a first specified distance and/or close view pixels, distance information of which is smaller than a second specified distance, and performs the blurring processing on the target pixels.

The parallax information includes a parallax map that indicates a parallax amount between corresponding points in the pair of viewpoint images, and the blurring processing unit determines, as the target pixels to be subjected to the blurring processing, pixels constituting corresponding points, a parallax amount between which is equal to or more than a specified value, and performs the blurring processing on the target pixels.

The blurring processing unit determines, as the target pixels of the plane image which are to be subjected to the blurring processing, pixels constituting an area specified by user operation, and performs the blurring processing on the target pixels.

The parallax information includes the parallax map that indicates a parallax amount between corresponding points in the pair of viewpoint images, and the blurring processing unit performs the blurring processing on pixels constituting the respective corresponding points to an extent corresponding to the parallax amount between the corresponding points.

The blurring processing unit performs on the target pixels the blurring processing to an extent specified by user operation.

The second point of time is a point of time when an instruction to take a plane image is inputted by user operation, and the first point or points of time are a point or points of time before the second point of time.

The second point of time is a point of time when an instruction to take a plane image is inputted by user operation, and the first point or points of time are a point or points of time after the second point of time.

The diaphragm control unit is capable of executing second diaphragm control that controls an open amount of the diaphragm unit so as to decrease parallax between corresponding points of the pair of viewpoint images outputted from the imaging unit at the second point of time.

The imaging device further includes a difference calculation unit configured to calculate a difference between each of a plurality of pairs of viewpoint images outputted from the imaging unit at the plurality of first points of time and a pair of viewpoint images outputted from the imaging unit at the second point of time, wherein the parallax information calculation unit calculates parallax information based on, among the plurality of pairs of the viewpoint images outputted from the imaging unit at the plurality of first points of time, the pair of viewpoint images having a smallest difference calculated by the difference calculation unit.

The difference includes a motion vector.

The present invention provides an imaging method performed by an imaging device including: a single imaging optical system; an imaging unit capable of continuously outputting a pair of viewpoint images made up of a first image and a second image, by pupil-dividing subject images that have passed through first and second different areas in predetermined directions of the imaging optical system, and forming the respective subject images on two photoelectric conversion element groups to photoelectrically convert the respective subject images; and a diaphragm unit capable of adjusting an amount of luminous flux which forms images on the photoelectric conversion element groups of the imaging unit, the imaging method comprising: a step of executing first diaphragm control that controls an open amount of the diaphragm unit so as to acquire parallax between corresponding points of the pair of viewpoint images outputted from the imaging unit at one arbitrary first point of time or a plurality of arbitrary first points of time, while executing second diaphragm control that controls the open amount of the diaphragm unit so as to be smaller than the open amount obtained by the first diaphragm control at an arbitrary second point of time that is temporally before or after the first point or points of time; a step of controlling the imaging unit so as to output the pair of viewpoint images at the first point or points of time and the second point of time; a step of calculating parallax information based on the pair of viewpoint images outputted from the imaging unit at the first point or points of time; a step of generating a plane image based on the pair of viewpoint images outputted from the imaging unit at the second point of time; and a step of determining target pixels in the plane image which are to be subjected to blurring processing, based on the calculated parallax information, and performing blurring processing on the determined target pixels in the plane image.

In the imaging device and the imaging method of the present invention, a pair of viewpoint images are imaged with a diaphragm aperture on an open side, and parallax information is acquired from the pair of viewpoint images at a first point of time, while at a second point of time, a pair of viewpoint images is imaged with a diaphragm aperture on a close side with respect to the diaphragm aperture at the first point of time to generate a plane image with less blurring as a whole, target pixels that are subjected to blurring processing are determined based on the parallax information, and blurring processing is performed on the determined target pixels. As a consequence, in the pupil dividing-type imaging device, blurring can be applied to an appropriate position corresponding to the parallax information that indicates information such as the distance of a subject and the size of a parallax amount.

DETAILED DESCRIPTION OF THE PREFERRED EMBODIMENTS

First Embodiment

Figure 1:
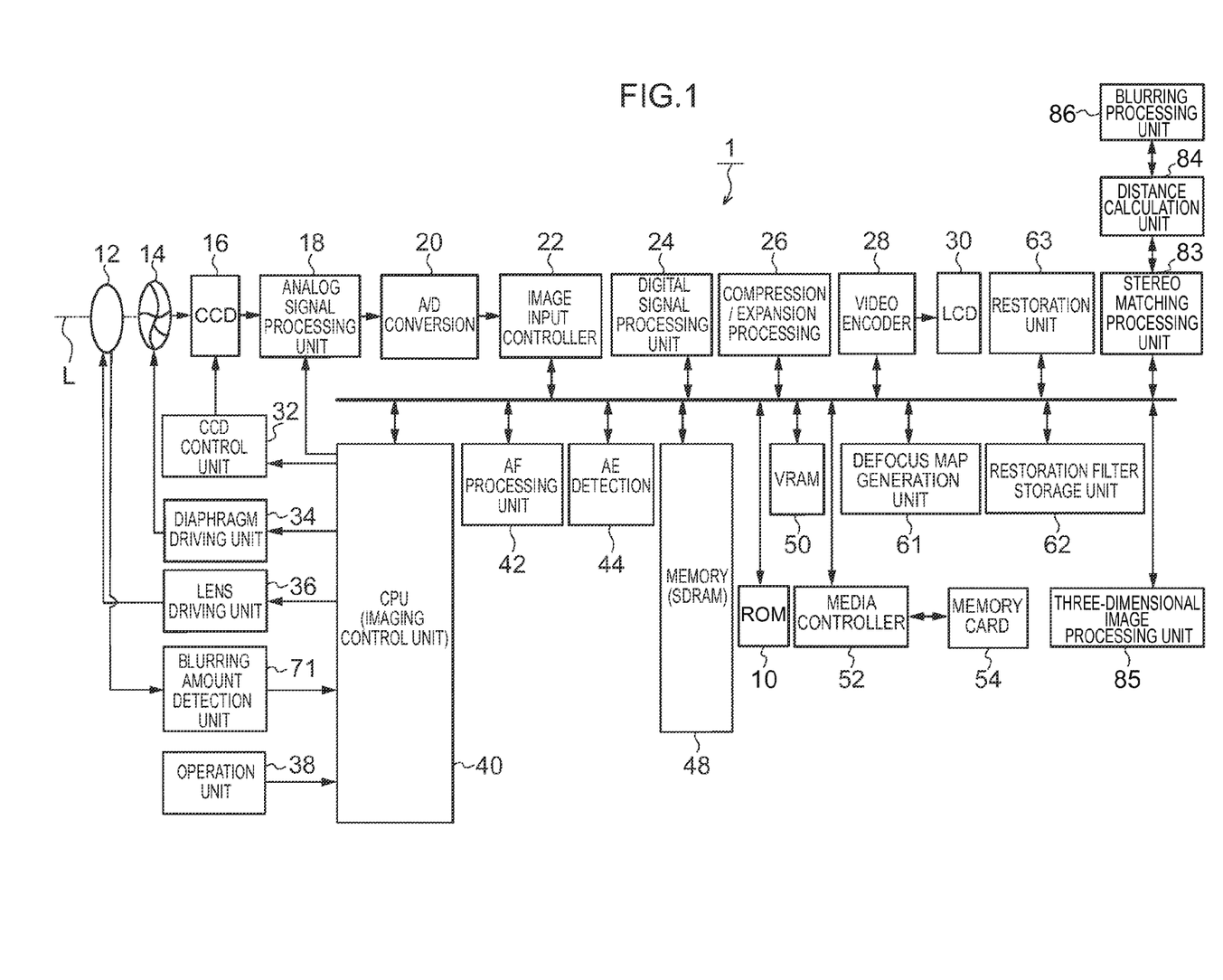
FIG. 1 is a block diagram of a camera according to a first embodiment.

FIG. 1 is a block diagram showing a mode for implementing a camera 1 according to the first embodiment.

The camera 1 is configured to record imaged images on a memory card 54, and the operation of the entire device is collectively controlled by a central processing unit (CPU) 40.

The camera 1 includes an operation unit 38 such as a shutter button, a mode dial, a reproduction button, a MENU/OK key, a cross key, and a BACK key. A signal from the operation unit 38 is inputted into the CPU 40, and the CPU 40 controls each circuit of the camera 1 based on inputted signals. For example, the operation unit 38 performs such control as lens drive control, diaphragm drive control, photographing operation control, image processing control, image data recording/reproduction control, and display control of an LCD monitor (LCD) 30 for stereoscopic display.

A ROM 10 stores programs executed by the CPU 40 and various data necessary for executing control, pixel defect information of the CCD 16, various constants/information relating to camera operation, and the like.

The shutter button, which is a manual operation button configured to input a photographing start instruction, is made of a two-stage stroke-type switch having an S1 switch that is turned on at the time of half pressing and an S2 switch that is turned on at the time of full pressing. The mode dial is selection means that selects any one of an auto photographing mode for photographing a static image, a manual photographing mode, a scene position such as person, scenery, and night view, and a dynamic image mode for taking a dynamic image.

The reproduction button is a button for switching to a reproduction mode in which photographed/recorded stereoscopic image (3D image) and plane image (2D image) are displayed in a static mode or a dynamic mode on the LCD monitor 30. The MENU/OK key is an operation key configured to function as a menu button for instructing a menu to be displayed on the screen of the LCD monitor 30, and as an OK button for instructing confirmation and execution of a selected content, or the like. The cross key is an operation unit that inputs an instruction of four directions of up, down, left and right directions, and functions as a button (cursor movement control means) for selecting an item from the menu screen or instructing selection of various setting items from each menu. The up/down key of the cross key functions as a zoom switch at the time of photographing or a reproduction zoom switch at the time of reproduction mode, while the left/right key functions as a frame-by-frame playback (forward/backward playback) button at the time of reproduction mode. The BACK key is used to delete a desired target such as a selection item, to cancel an instruction content, to undo previous operation, or the like.

In the photographing mode, image light representing a subject forms an image on a light receiving surface of a solid-state image sensor (hereinafter, referred to as a "CCD," though a "CMOS" is also applicable) 16 that is a phase difference image sensor capable of acquiring a pupil division parallax image through an imaging lens 12 and a diaphragm 14. The imaging lens 12 is driven by a lens driving unit 36 controlled by the CPU 40 and is subjected to focus control, zoom (focal length) control, and the like. For example, the diaphragm 14 is made up of five aperture blades and is driven by a diaphragm driving unit 34 controlled by the CPU 40, so that diaphragm control is performed in five stages in the range of diaphragm values (F values) of F2.8 to F11 in units of AV.

The CPU 40 controls the diaphragm 14 via the diaphragm driving unit 34 while executing control such as control on reading of charge storage time (shutter speed) in the CCD 16 and reading of image signals from the CCD 16 via a CCD control unit 32.

<Configuration Example of CCD>

Figure 2:
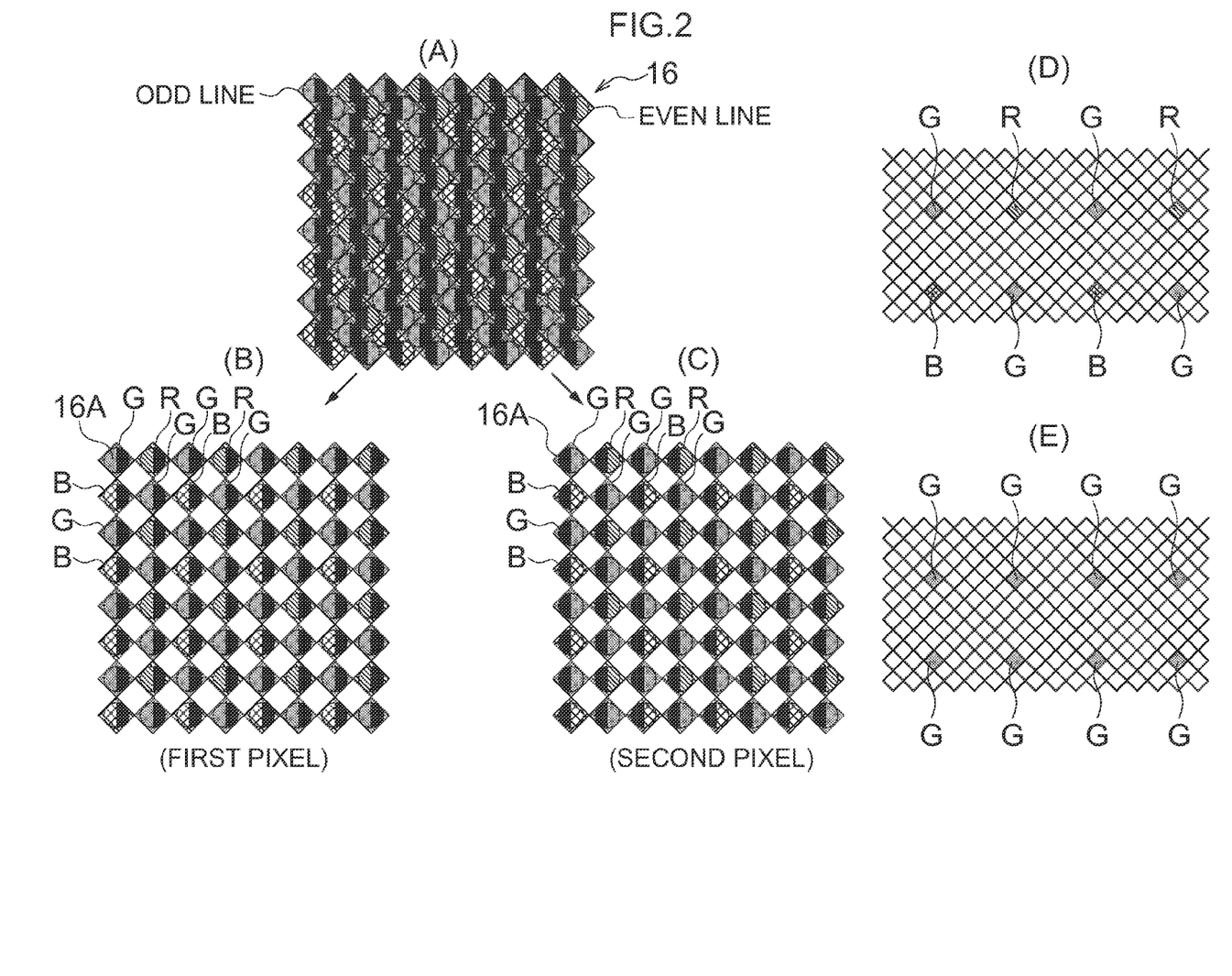
FIG. 2 is a view showing a configuration example of CCD image sensors for acquiring a pupil division parallax image.

FIG. 2 is a view showing a configuration example of the CCD 16.

As shown in (A) portion of FIG. 2, the CCD 16 has pixels of odd lines and pixels of even lines, each arrayed in a matrix form. Image signals for two surfaces, each photoelectrically converted by the pixels of these two lines, may independently be read out. A plurality of light receiving elements corresponding to each pixel group form a valid pixel area for acquiring a valid imaging signal and an optical black area (hereinafter, referred to as an "OB area") for acquiring a black level reference signal. The OB area is actually formed so as to surround the periphery of the valid pixel area.

As shown in (B) portion of FIG. 2, the odd lines (1, 3, . . . ) of the CCD 16 include, out of pixels having color filters of R (red), G (green), and B (blue), a line with pixel arrangement of GRGR . . . and a line with the pixel arrangement of BGBG . . . provided in an alternate manner. As shown (C) portion of FIG. 2, the pixels of the even lines (2, 4, 6 . . . ) include, as in the odd lines, a line with the pixel arrangement of GRGR . . . and a line with the pixel arrangement BGBG . . . provided in an alternate manner, while the pixels are positioned so as to be shifted with respect to the pixels of the even lines by a half pitch in a line direction.

Placement areas of the first pixels and the second pixels which constitute image signals of two surfaces may be identical or different. For example, the first pixels may exist over the entire valid pixel area, while the second pixels may exist only a specific area within an AF area, or the like. The second pixels may be arrayed over the entire valid pixel area or a specific area in high density, or may be arrayed in low density.

More specifically, as shown in (D) and (E) portions of FIG. 2, the number of the second pixels may be smaller than the number of the first pixels. In (D) and (E) portions of FIG. 2, white portions represent the first pixels and black portions represent the second pixels. The color filter for the black portions may be an RGB color filter ((D) portion of FIG. 2), or may be only a G color filter ((E) portion of FIG. 2) for obtaining brightness information. The configuration of (D) portion of FIG. 2 has an advantage that the RGB color filters may be used without the need of changing the arrangement thereof in between the first pixels and the second pixels, whereas the configuration of (E) portion of FIG. 2 has an advantage that the information on the respective second pixels may be used for detection of the defocus amount.

Figure 3:
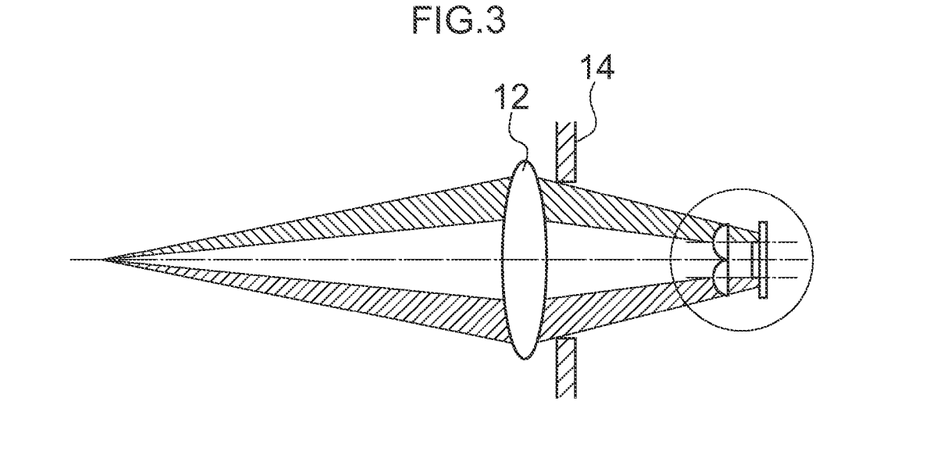
FIG. 3 is a view showing one pixel out of first and second pixels.
Figure 4:
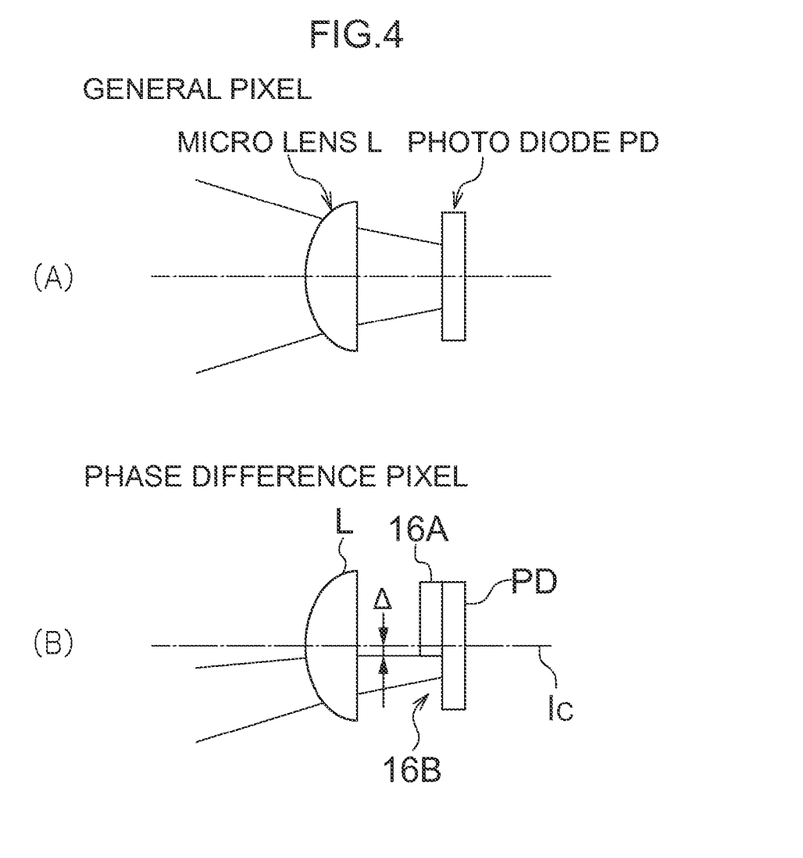
FIG. 4 is an expanded view showing a principal part of FIG. 3.

FIG. 3 is a view showing the imaging lens 12, the diaphragm 14, and one pixel of the first and second pixels of the CCD 16 in (A) portion of FIG. 2. FIG. 4 is an expanded view showing a principal part of FIG. 3.

As shown in (A) portion of FIG. 4, luminous flux passing an exit pupil enters a general CCD pixel (photo diode PD) through a micro lens L without being limited.

On the contrary, as shown in (B) portion of FIG. 4, a shielding member 16A is formed on the first pixel and the second pixel of the CCD 16. In the case of imaging with the camera being laterally placed, a right half or a left half of the light receiving surface of the first pixel and the second pixel (photo diode PD) is shaded by the shielding member 16A. On the other hand, in the case of imaging with the camera being longitudinally placed, an upper half or a lower half of the light receiving surface of the first pixel and the second pixel (photo diode PD) is shaded by the shielding member 16A. An opening 16B of the shielding member 16A is provided at a position deviated rightward, leftward, upward or downward (leftward from the optical axis in (B) portion of FIG. 4, for example) from an optical axis Z of the micro lens L by a specified amount Δ. The luminous flux passes the opening 16B and reaches the light receiving surface of the photo diode PD. That is, the shielding member 16A functions as a pupil dividing member.

It is to be noted that the first pixel and the second pixel are different in area (a right half/left half area, or an upper half/lower half area) where luminous flux is limited by the shielding member 16A. For example, if the left half of luminous flux is limited in the first pixel, and if the right half of luminous flux is limited in the second pixel, a right viewpoint image is obtained from the first pixel and a left viewpoint image is obtained from the second pixel. Alternatively, if the upper half of luminous flux is limited in the first pixel and the lower half of luminous flux is limited in the second pixel, a lower viewpoint image is obtained from the first pixel and an upper viewpoint image is obtained from the second pixel.

Therefore, as shown in FIG. 8, in accordance with rear focus, in-focus, and front focus states, outputs of the first pixel and the second pixel are out of alignment or aligned in phase. Since a phase difference between output signals of the first pixel and the second pixel corresponds to a defocus amount of the imaging lens 12, it becomes possible to execute AF control of the imaging lens 12 by detecting the phase difference phase difference AF).

In the above-configured CCD 16, the first pixel and the second pixel are configured to be different in area (right half and left half) where luminous flux is limited by the shielding member 16A, though the configuration of the CCD 16 is not limited thereto. Instead of providing the shielding member 16A, the micro lens L and the photo diode PD may be relatively shifted in a horizontal direction, and luminous flux entering the photo diode PD may be limited depending on the shift direction. Further, luminous flux entering each pixel may be limited by one micro lens provided for two pixels (the first pixel and the second pixel), or pupil division may be achieved by a mirror (FIG. 7 for example). In short, the present invention is applied to a camera that acquires a phase difference image by pupil division.

With reference again to FIG. 1, signal electric charges stored in the CCD 16 are read out as voltage signals corresponding to the signal electric charges based on a read-out signal added by the CCD control unit 32. A voltage signal read out from the CCD 16 is applied to an analog signal processing unit 18, where R, G, and B signals for each pixel is sample-held and amplified, before being applied to an A/D converter 20. The A/D converter 20 converts R, G, and B signals, which are sequentially inputted, into digital R, G, and B signals and outputs them to an image input controller 22.

A digital signal processing unit 24 performs specified signal processing, such as gain control processing including offset processing, white balance correction, and sensitivity correction, gamma correction processing, and YC processing, on digital image signals inputted via the image input controller 22.

Here, as shown in (B) and (C) portions of FIG. 2, first image data read out from the first pixel in the odd line of the CCD 16 is processed as left viewpoint image data, while second image data read out from the second pixel in the even line is processed as right viewpoint image data. Also in (D) and (F) portions of FIG. 2, first image data read out from the first pixel is processed as left viewpoint image data, while second image data read out from the second pixel in the even line is processed as right viewpoint image data. It is to be noted that there is no necessity that the first image data is left viewpoint image data and the second image data is right viewpoint image data, and therefore they may be exchanged with each other.

The left viewpoint image data and the right viewpoint image data (3D image data) which were processed in the digital signal processing unit 24 are inputted into a VRAM 50. The VRAM 50 includes an area A and an area B which store 3D image data each representing 3D images for one frame. In the VRAM 50, the 3D image data representing 3D image for one frame is alternately rewritten on the area A and the area B. Written 3D image data is read out from one of the area A and the area B of the VRAM 50, which is not the area where 3D image data is currently being rewritten. The 3D image data read out from the VRAM 50 is encoded in a video encoder 28 and outputted to the LCD monitor (LCD) 30 for stereoscopic display provided on the rear surface of the camera. As a consequence, a 3D subject image is displayed on the display screen of the LCD monitor 30.

The LCD monitor 30 is stereoscopic display means that can display, with a parallax barrier, stereoscopic images (left viewpoint image and right viewpoint image) as directive images each having specified directivity. However, without being limited thereto, the stereoscopic display means may use lenticular lenses and may involve wearing of exclusive glasses, such as polarized glasses and liquid crystal shutter glasses, to enable viewers to view the left viewpoint image and the right viewpoint image in an individual manner.

Upon first stage-pressing (half pressing) of the shutter button of the operation unit 38, the CPU 40 starts AF operation and AE operation, and performs control so that a focus lens in the imaging lens 12 comes into an in-focus position via the lens driving unit 36. Image data outputted from the A/D converter 20 when the shutter button is half pressed is captured into an AE detection unit 44.

The AE detection unit 44 integrates G signals of the entire screen, or integrates weighted G signals, which are differently weighted between a middle portion and a peripheral portion of the screen, and outputs the resultant integrated value to the CPU 40, The CPU 40 calculates brightness (photographing Ev) of the subject from the integrated value inputted from the AE detection unit 44, determines a diaphragm value of the diaphragm 14 and an electronic shutter (shutter speed) of the CCD 16 based on the photographing Ev according to a specified program diagram so as to be able to obtain correct exposure, and controls the diaphragm 14 via a diaphragm driving unit 33 based on the determined diaphragm value (diaphragm control for a plane image), while controlling charge storage time in the CCD 16 via, the CCD control unit 32, based on the determined shutter speed. It is to be noted that brightness of the subject may be calculated based on an external photometry sensor.

The specified program diagram shows photographing (exposure) conditions designed from a combination of the diaphragm value of the diaphragm 14 and the shutter speed of the CCD 16 or a combination of these parameters and photographing sensitivity (ISO sensitivity), corresponding to the brightness (photographing EV) of the subject.

The specified program diagram herein includes a parallax-oriented program diagram and a focus-oriented program diagram.

First, the parallax-oriented program diagram uses an F value fixed to a small constant value, By conducting photographing under photographing conditions determined according to the program diagram, it becomes possible to photograph a main image and a sub image having desired parallax irrespective of the brightness of the subject.

For example, the parallax-oriented program diagram is so designed that the F value takes a fixed value of 1.4 (AV=1), and with the photographing EV being in the range of 7 to 12 (being lighter), only the shutter speed is varied from $\frac{1}{60}$ seconds (TV=6) to $\frac{1}{2000}$ (TV=11) in accordance with the photographing EV. Further, the parallax-oriented program diagram is so designed that with the photographing EV being smaller than 7 (being darker), the ISO sensitivity is varied from 100 to 200, 400, 800, 1600, and 3200 as the photographing EV becomes smaller by 1 EV, in the fixed state of F value=1.4 and shutter speed=$\frac{1}{60}$ seconds. In other words, even when the subject is bright, the diaphragm 14 is not narrowed, but the shutter speed is slowed to adjust subject brightness.

If the F value is fixed to a larger value, parallax becomes smaller, whereas if the F value is fixed to a smaller value, parallax becomes larger. Accordingly, in response to the parallax instructed by a user via the operation unit 38, the F value to be fixed and the program diagram may be changed.

Since the F value is fixed to a small constant value in the parallax-oriented program diagram, it becomes possible to photograph a main image and a sub image having fixed parallax. However, if the photographing EV is larger than 16 (if the shutter speed becomes a maximum value), it becomes impossible to perform photographing due to overexposure. However, if the camera 1 is provided with an additional configuration for automatic insertion of an ND filter to allow light amount reduction, photographing is possible even when the photographing EV is larger than 16.

Contrary to the above, the focus-oriented program diagram uses an F value fixed to a large constant value. By conducting photographing under photographing conditions determined according to the focus-oriented program diagram, it becomes possible to photograph an image in the state where the entire image is in focus irrespective of the brightness of the subject.

For example, a specified program diagram is so designed that the F value takes a fixed value of 5.6 (AV=5), and with the photographing EV being in the range of 11 to 16, only the shutter speed is varied from $\frac{1}{60}$ seconds (TV=6) to $\frac{1}{2000}$ (TV=11) in accordance with the photographing EV. Further, the specified program diagram is so designed that with the photographing EV being smaller than 11 (being darker), the ISO sensitivity is varied from 100 to 200, 400, 800, 1600, and 3200 as the photographing EV becomes smaller by 1 EV, in the fixed state of F value=5.6 and shutter speed=$\frac{1}{60}$ seconds. More specifically, when the subject is dark, the diaphragm 14 is not opened, but the shutter speed and the ISO sensitivity are increased to compensate the brightness.

Since the F value is fixed to a large constant value in the focus-oriented program diagram, it becomes possible to photograph an image in the state where the entire image is in-focus.

An AF processing unit 42 is a unit that performs contrast AF processing or phase difference AF processing. In the case of performing the contrast AF processing, a high frequency component is extracted from image data in a specified focus area (rectangular area in the middle of the screen, etc.) at least in one image data out of left viewpoint image data and right viewpoint image data, and the high frequency component is integrated to calculate an AF evaluation value that indicates the in-focus state. AF control is implemented by controlling the focus lens in the imaging lens 12 so that the AF evaluation value is maximized. In the case of performing the phase difference AF processing, there is detected a phase difference between image data corresponding to the first pixel and the second pixel within a specified focus area in the left viewpoint image data and the right viewpoint image data and a defocus amount is calculated based on information indicating the phase difference. AF control is implemented by controlling the focus lens in the imaging lens 12 so that the defocus amount becomes 0.

Once AE operation and AF operation are finished and second stage-pressing (full pressing) of the shutter button is carried out, image data for two images including a left viewpoint image (first image) and a right viewpoint image (second image), which respectively correspond to the first pixels and the second pixels outputted from the A/D converter 20 in response to the pressing, is inputted from the image input controller 22 to a memory (SDRAM) 48 where the image data is temporarily stored.

The image data for two images temporarily stored in the memory 48 is suitably read out by the digital signal processing unit 24, which then performs specified signal processing including processing to generate luminance data and color difference data of the image data (YC processing). The image data (YC data) subjected to YC processing is again stored in the memory 48. Next, the YC data for two images are each outputted to a compression/expansion processing unit 26 where specified compression processing according to the REG (joint photographic experts group) or the like are executed, and then the data is again stored in the memory 48.

A multi-picture file (MP file: a file in the format where a plurality of images are concatenated) is generated from the YC data (compressed data) for two images stored in the memory 48. The MP file is read out by a media controller 52 and stored in a memory card 54.

A defocus map generation unit 61 not only calculates a phase difference corresponding to the first pixel and the second pixel in each small area included in a specified focus area, but also calculates a plurality of small areas each which substantially cover the entire valid pixel area. The plurality of small areas that substantially cover the entire valid pixel area do not need to completely cover the entire valid pixel area, but may only be arrayed over the entire valid pixel area in high or low density. For example, the phase difference is calculated in each subarea of the valid pixel area, which is formed by dividing the area in a specified size (e.g., 8×8 pixels), in a smaller size (e.g., 1×1 pixel), or in a larger size (e.g., 10×10 pixels), in a matrix form. Alternatively, the phase difference is calculated for each subarea of a specified unit at a specified interval (e.g., one subarea, more than one subarea, or less than one subarea) with an outside edge of the valid pixel area as a starting point. In short, while the phase difference is calculated over the entire valid pixel area, it is not necessary to perform calculation in all the small areas that constitute the valid pixel area.

The defocus map generation unit 61 calculates a defocus amount corresponding to each of the small areas based on the phase difference calculated in each of the small area. A set of the defocus amounts that correspond to the respective small areas and that are calculated over the entire valid pixel area is referred to as a defocusing map. The defocus map generation unit 61 has a volatile storage medium, such as a RAM, which temporarily stores the calculated defocusing map. The defocus map generation unit 61 may detects characteristic points and corresponding points between the respective viewpoint images in a stereo matching processing unit 83, and generate a defocusing map based on a difference in position information between those characteristic points and corresponding points.

A restoration filter storage unit 62 is made of a nonvolatile storage medium, such as a ROM, and stores a restoration filter corresponding to an image height (a distance from an image center, typically a distance from an optical axis center L of the imaging lens 12) and a defocus amount (or subject distance) in each small area in each viewpoint image.

A restoration unit 63 performs deconvolution of small areas in each viewpoint image with a restoration filter selected for each small area so as to restore the small areas in the corresponding viewpoint image. This signal processing removes blurring in the optical system, more particularly blurring of an image corresponding to the pixels in the periphery of the light receiving surface where unbalanced incidence of luminous flux occurs.

The stereo matching processing unit (object detection means) 83 is configured to detect one or more corresponding points (objects) that correspond to each other between two pieces of image data A and B stored in the memory 48 at the same timing. It is to be noted that for the processing method in the stereo matching processing unit 83, publicly known technologies that use methods such as an area-based method, a segment-based method, and an isophote method, can be employed. Moreover, both passive stereo matching and active stereo matching may be used. Stereo matching between images different in number of pixels can be performed based on publicly known technologies as disclosed in, for example, Japanese Patent Application Laid-Open No. 2008-92007, Japanese Patent Application Laid-Open No. 08-331607, Japanese Patent Application Laid-Open No. 2008-141666, Japanese Patent Application Laid-Open No. 2009-14445, Japanese Patent Application Laid-Open No. 2008-116309, and Japanese Patent Application Laid-Open No. 2000-102040.

A distance calculation unit 84 calculates three-dimensional coordinate values (distance information) of the corresponding points detected by the above-stated stereo matching processing unit 83. In the method for calculating distance information in the distance calculation unit 84, a publicly known technology that involves calculation based on the principle of triangulation may be used. It is to be noted that the stereo matching processing unit 83 and the distance calculation unit 84 may be configured by a program, or an IC, an LSI, or the like.

A parallax map (in which a parallax amount between a corresponding point of a reference viewpoint image, e.g., image data A and a corresponding point of another viewpoint image, e.g., image data B, expresses the other viewpoint image) is technically equivalent to distance information, and so that the following processing with respect to distance information may also be applied to the parallax map. Further, information on a distance to the subject or a parallax map is collectively referred to as parallax information. Calculation of the parallax information may also be performed not in the camera 1 but in other information processing apparatuses like personal computers.

Obtained pixels in the first image data and obtained pixels in the second image data may be identical or may be different in configuration. Although the first image data has color information and brightness information, the second image data may have only the brightness information. Alternatively, the second pixel may be a monochrome CCD that can receive signals of an infrared region, and active stereo matching with infrared light may be employed as in Japanese Patent Application Laid-Open No. 08-331607.

Hereinafter, in order to enable stereo matching, both the first image data and the second image data are configured to include at least the brightness information. In order to add color information to a two-dimensional image, both the first image data and the second image data are preferably configured to include the color information. Herein, to simplify explanation, both the first image data and the second image data are configured to include the brightness information and the color information.

A three-dimensional image processing unit 85 can generate a three-dimensional age from a pair of viewpoint images acquired from the CCD 16. This is similar to the configuration in Japanese Patent Application Laid-Open No. 2009-124308. It is to be noted that three-dimensional image generation from parallax information can be performed based on known technologies as seen in Japanese Patent Application Laid-Open No. 08-331607, Japanese Patent Application Laid-Open No. 2008-141666, Japanese Patent Application Laid-Open No. 2009-14445, Japanese Patent Application Laid-Open No. 2008-116309, and Japanese Patent Application Laid-Open No. 2000-102040. Three-dimensional image generation is carried out when the photographing mode is set to "3D static image recording," by which a stereoscopic image having a desired parallax amount is displayed on the LCD 30.

The parallax amount of a three-dimensional image generated by a three-dimensional image processing unit 45 may be a fixed value or an arbitrary set value.

A blurring processing unit 86 performs low pass filter processing that removes image signal components in the range with a predetermined frequency or more.

Figure 5:
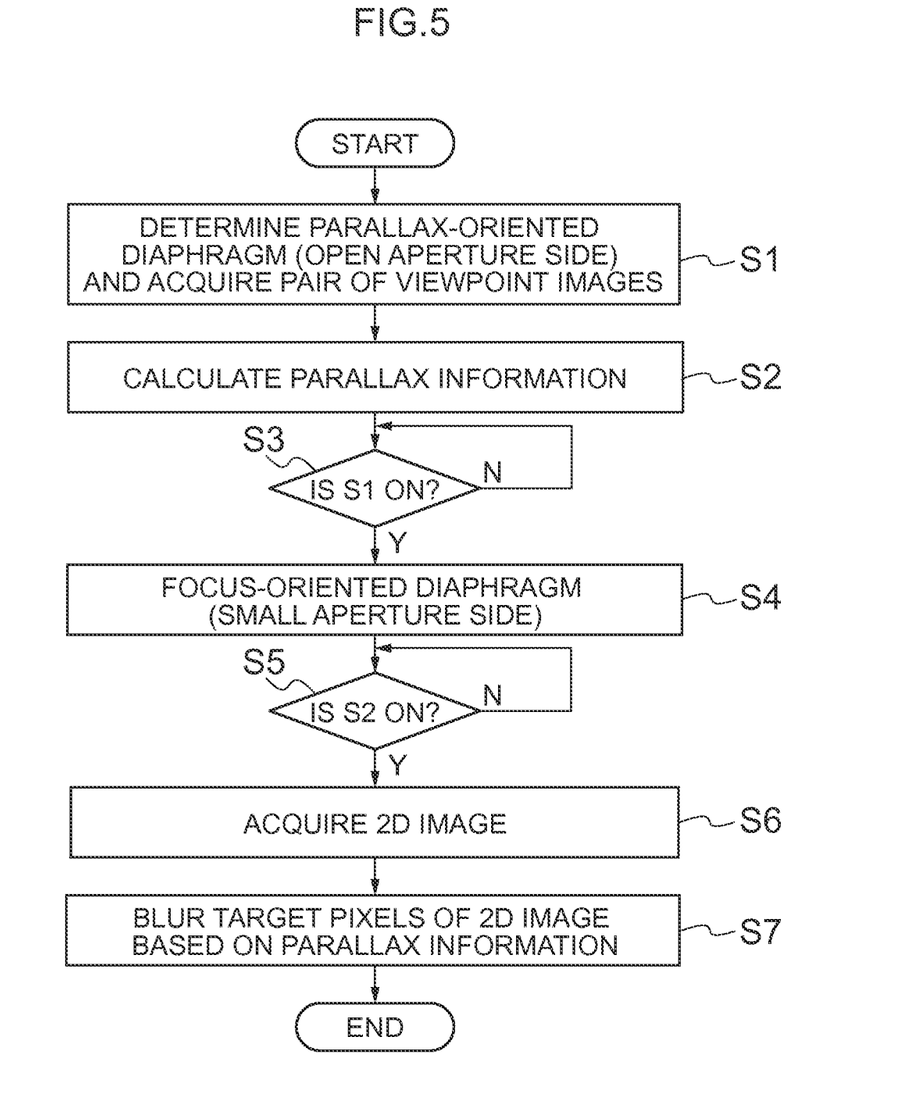
FIG. 5 is a flow chart of imaging processing of a plane static image according to the first embodiment.

FIG. 5 shows a flow chart of imaging processing of a plane static image according to a first preferred embodiment of the present invention. This processing is started in response to the photographing mode being set to "2D static image recording."

In S1, in response to the photographing mode being set to "2D static image recording," the CPU 40 determines a diaphragm value X and a shutter speed according to the parallax-oriented program diagram. The CPU 40 then controls the diaphragm 14 via the diaphragm driving unit 33 based on the determined diaphragm value X (parallax-oriented diaphragm control), while controlling the charge storage time in the CCD 16 via the CCD control unit 32 based on the determined shutter speed. As a consequence, right and left image data A and B (pair of viewpoint images) having parallax is acquired from the CCD 16. It is to be noted that one of the image data. A and B may be one of the images that are displayed as a 2D through image on the LCD 30, or may be different from the 2D through image.

In S2, the CPU 40 causes the stereo matching processing unit 83 and the distance calculation unit 84 to calculate stereo matching and distance information (parallax information). The stereo matching processing unit 83 performs stereo matching based on the image data. A and B for one frame acquired in S1. The distance calculation unit 84 calculates distance information for each corresponding point detected by the stereo matching processing unit 83.

In S3, the CPU 40 determines whether or not the first stage-pressing (half pressing) of the shutter button of the operation unit 38 is carried out. If Yes, the procedure proceeds to S4, whereas if No, the determination processing of S3 is repeated.

In S4, the CPU 40 determines a diaphragm value Y and a shutter speed according to the focus-oriented program diagram. As a result, the diaphragm value Y is in a relation of being larger than the diaphragm value X (on a small aperture side). In other words, the diaphragm value X is in a relation of being smaller than the diaphragm value Y (on an open aperture side). For example, X=1.4 and Y=5.6. The CPU 40 then controls the diaphragm 14 via the diaphragm driving unit 33 based on the diaphragm value Y determined in S4 (focus-oriented diaphragm control).

In S5, the CPU 40 determines whether or not the second stage-pressing (full pressing) of the shutter button of the operation unit 38 is carried out. If Yes, the procedure proceeds to S6, whereas if No, the determination processing of S3 is repeated.

In S6, the CPU 40 controls the charge storage time in the CCD 16 via the CCD control unit 32 based on the determined shutter speed, concurrently with the focus-oriented diaphragm control in S4. This makes it possible to acquire right and left image data A and B having no parallax (blurring or defocus amount) (or having very small parallax if there are any parallax) between respective corresponding points. The CPU 40 adds up image signals for every two pixels which correspond to one pupil-divided luminous flux for the right and left image data A and B. As a consequence, a 2D image with high resolution is generated.

In S7, the blurring processing unit 86 determines target pixels, which are subjected to blurring processing, based on the distance information (parallax information) for each corresponding point calculated in S2. The blurring processing unit 86 performs the blurring processing on the determined target pixels subjected to the blurring processing.

The blurring processing target pixels are automatically determined. However, the target pixels may additionally be determined based on user operation. For example, pixels are determined as a target of blurring processing as shown below.

Example 1

The blurring processing unit 86 refers to distance information of each pixel to determine, as the blurring processing target pixels, distant view pixels with a distance larger than a first specified distance (for example, pixels of a subject image with a distance of 5 m or more) or close view pixels with a distance smaller than a second specified distance (for example, pixels of a subject image with a distance of 50 cm or less).

Example 2

The blurring processing unit 86 refers to a parallax map of each pixel to determine, as the blurring processing target pixels, pixels constituting the corresponding points at which a parallax amount between the corresponding points is equal to or larger than a specified value (for example, a value equal to two pixels).

Example 3

In addition to Example 1 and/or Example 2, the blurring processing unit 86 determines each pixel included in an area specified by user operation as the blurring processing target pixels.

The extent of blurring processing may be determined based on user operation, or may be determined automatically.

For example, when a user specifies strong blurring, the blurring processing unit 86 sets α as a lower limit threshold of the frequency of image signal components that are removal targets of the low pass filter processing. When middle blurring is specified, β is set as a lower limit threshold of the frequency, and when small blurring is specified, γ is set as a lower limit threshold of the frequency. In this case, the relationship of α<β<γ is established.

Alternatively, the blurring processing unit 86 may vary the extent of blurring in accordance with the parallax amount indicated in the parallax map. In short, if the parallax amount between certain corresponding points is large, then the extent of blurring in these corresponding points is increased in accordance to the parallax amount.

As described in the foregoing, the camera 1 images a pair of viewpoint images with an open diaphragm aperture and acquires parallax information from the pair of viewpoint images, while imaging a pair of viewpoint images with a small diaphragm aperture to obtain a 2D image with less blurring as a whole. Based on the parallax information, the camera 1 determines portions of the 2D image where blurring processing is performed, and performs the blurring processing on the determined portions. As a consequence, in the pupil dividing-type imaging device, blurring is applied to an appropriate position corresponding to the parallax information which indicates information such as the distance of a subject and the size of a parallax amount.

Second Embodiment

Figure 6:
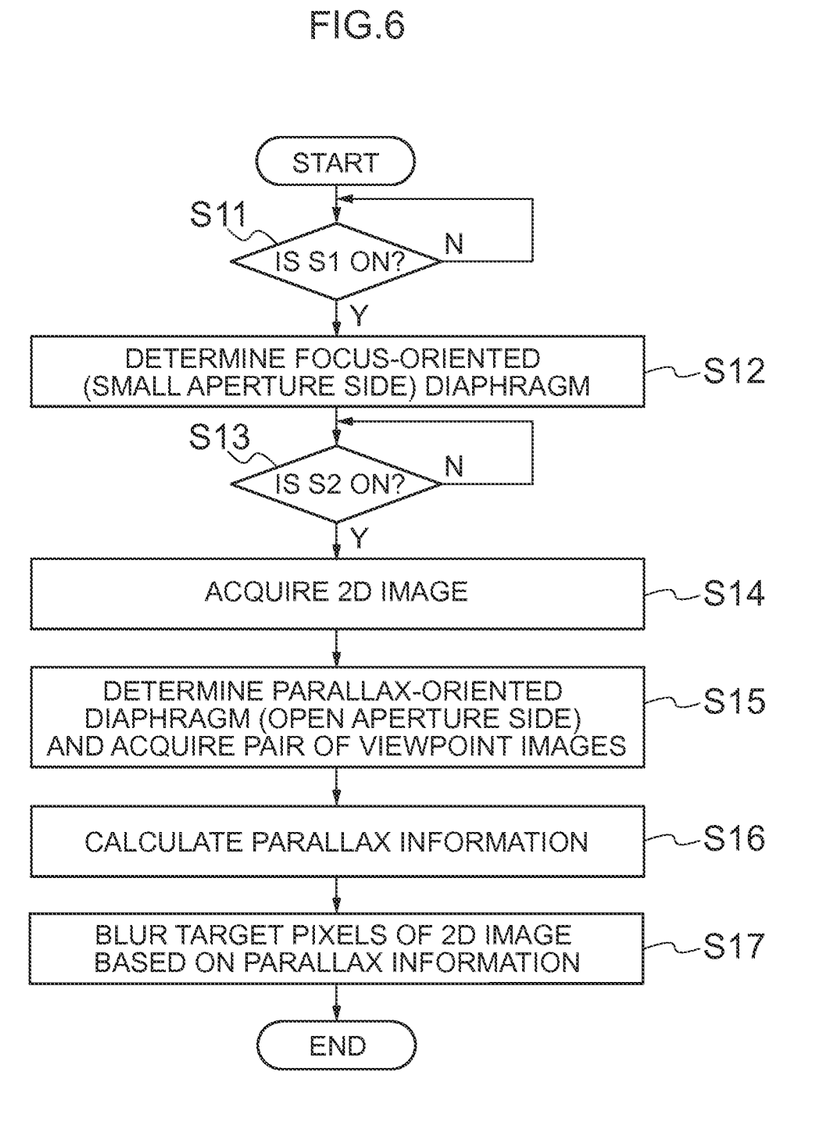
FIG. 6 is a flow chart of imaging processing of a plane static image according to a second embodiment.

FIG. 6 shows a flow chart of imaging processing of a plane static image according to a second preferred embodiment of the present invention. This processing is started in response to the photographing mode being set to "2D static image recording."

Steps S11 to S14 are similar to steps S3 to S6.
Steps S15 to S16 are similar to steps S1 to S2.
Step S17 is similar to step S7.

When the photographing mode is "2D static image recording," a pair of viewpoint images itself, which were imaged according to the parallax-oriented program diagram, is not recorded. Therefore, acquisition timing of the pair is basically arbitrary. However, in order to minimize a composition gap between pairs of viewpoint images at the two different points of time, the pair should preferably be acquired at adjacent points of time before or after the second stage-pressing of the shutter button. In the case where a pair of viewpoint images is acquired before the second stage-pressing, that is, before the first stage-pressing of the shutter button, as in the first embodiment, there is an advantage of a small time lag between the second stage-pressing and recording of a 2D image. However, since the first stage-pressing of the shutter button arbitrarily occurs, the composition gap may become large depending on conditions.

Meanwhile, as in the present embodiment, if a pair of viewpoint images for parallax information is acquired after acquisition of a pair of viewpoint images for 2D image in response to the second stage-pressing of the shutter button, then composition gap between the pairs is decreased. Therefore, the target pixels for blurring processing are correctly determined.

Third Embodiment

In imaging processing of a plane static image in the first embodiment, the diaphragm 14 may constantly be opened and one pair or a plurality of pairs of viewpoint images may be acquired in S1. A difference between those pairs of viewpoint images and a 2D image (blurring target image) acquired in S6 may respectively be calculated, and a pair of viewpoint images with the smallest difference may be defined as the pair of viewpoint images for calculation of parallax information in S2.

For example, the CPU 40 synthesizes, in units of pair, one pair or a plurality of pairs of viewpoint images acquired with the diaphragm 14 being opened, and generates a 2D image (candidate image) that serves as a candidate for calculation of parallax information. The CPU 40 calculates a motion vector between the candidate image and the blurring target image. As the method for detecting the motion vector, various kinds of publicly known technologies may be employed. For example, the CPU 40 first extracts an area (tracking target area) including a movable body from the candidate image acquired at a certain point of time (for example, at the beginning) and stores the area in the VRAM 50 as a template. The CPU 40 then calculates a correlation value while minutely shifting positions of the template on the blurring target image, and an area where correlation is the largest is obtained so as to detect the motion vector (pattern matching method).

The CPU 40 determines a pair of viewpoint images corresponding to the candidate image having a minimum scalar quantity of the motion vector as the 3D image for calculation of parallax information, and calculates the parallax information from the determined 3D image.

As a consequence, a difference between 3D images and 2D images is reduced at the time of photographing a moving body, and thereby determination of blurring processing target pixels is carried out more correctly. It is to be noted that the above-described calculation of a difference between 3D images and 2D images, and the calculation of parallax information according to the result may be carried out only in the case where a mode for photographing a moving body, such as a sport mode, is selected. In other cases, parallax information may be calculated from the 3D image acquired after full pressing of the shutter as in the second embodiment.

Fourth Embodiment

In S1 and S4 of imaging processing of the plane static image in the first and third embodiments, or in S12 and S15 in the second embodiment, transmittance of a liquid crystal filter may be controlled instead of controlling an aperture diameter of the diaphragm 14.

More specifically, the liquid crystal filter is placed in an optical path before or after the diaphragm 14. In the liquid crystal filter, the transmittance equivalent to a small diaphragm aperture, or the transmittance equivalent to an open diaphragm aperture may be set in response to a control signal from the CPU 40. The transmittance equivalent to the open diaphragm aperture is continuous or gradual transmittance which spreads in a concentric fashion. The transmittance is higher toward the center. The transmittance equivalent to the small diaphragm aperture is substantially 100% (transparent).

If the CPU 40 opens the diaphragm 14 and controls the liquid crystal filter so as to set the transmittance equivalent to the open diaphragm aperture in S1 or S15 and to set the transmittance equivalent to the small diaphragm aperture in S4 or S12, then 3D images and 2D images can be obtained as in the above embodiment.

In this case, the light receiving amount of the CCD 16 can be controlled in a shorter timer, a time lag between 3D image acquisition and 2D image acquisition can be shortened, and blurring processing target pixels are determined more correctly by controlling the transmittance of the liquid crystal filter rather than successively and mechanically controlling the opening aperture of the diaphragm 14.

What is claimed is:

1. An imaging device, comprising:
a single imaging optical system;
an imaging unit capable of continuously outputting a pair of viewpoint images made up of a first image and a second image, by pupil-dividing subject images that have passed through first and second different areas in predetermined directions of the imaging optical system, and forming the respective subject images on two photoelectric conversion element groups to photoelectrically convert the respective subject images;
a diaphragm unit capable of adjusting an amount of luminous flux that forms images on the photoelectric conversion element groups of the imaging unit;
a diaphragm control unit capable of executing first diaphragm control that controls an open amount of the diaphragm unit so as to acquire parallax between corresponding points of the pair of viewpoint images outputted from the imaging unit at one arbitrary first point of time or a plurality of arbitrary first points of time, while executing second diaphragm control that controls the open amount of the diaphragm unit so as to be smaller than the open amount obtained by the first diaphragm control at an arbitrary second point of time that is temporally before or after the first point or points of time;
an imaging control unit configured to control the imaging unit so as to output the pair of viewpoint images at the first point or points of time and the second point of time;
a parallax information calculation unit configured to calculate parallax information based on the pair of viewpoint images outputted from the imaging unit at the first point or points of time;
a plane image generation unit configured to generate a plane image based on the pair of viewpoint images outputted from the imaging unit at the second point of time; and
a blurring processing unit configured to determine target pixels in the plane image which are to be subjected to blurring processing, based on the parallax information calculated by the parallax information calculation unit, and to perform blurring processing on the determined target pixels in the plane image, wherein
the parallax information includes distance information of respective pixels, and
the blurring processing unit determines, as the target pixels of the plane image which are to be subjected to the blurring processing, distant view pixels, distance information of which is larger than a first specified distance and/or close view pixels, distance information of which is smaller than a second specified distance, and performs the blurring processing on the target pixels.

2. The imaging device according to claim 1, wherein
the parallax information includes a parallax map that indicates a parallax amount between corresponding points in the pair of viewpoint images, and
the blurring processing unit determines, as the target pixels to be subjected to the blurring processing, pixels constituting corresponding points, a parallax amount between which is equal to or more than a specified value, and performs the blurring processing on the target pixels.

3. The imaging device according to claim 1, wherein
the blurring processing unit determines, as the target pixels of the plane image which are to be subjected to the blurring processing, pixels constituting an area specified by user operation, and performs the blurring processing on the target pixels.

4. The imaging device according to claim 1, wherein
the parallax information includes a parallax map that indicates a parallax amount between corresponding points in the pair of viewpoint images, and
the blurring processing unit performs the blurring processing on pixels constituting the respective corresponding points to an extent corresponding to the parallax amount between the corresponding points.

5. The imaging device according to claim 1, wherein
the blurring processing unit performs the blurring processing on the target pixels to an extent specified by user operation.

6. The imaging device according to claim 1, wherein
the second point of time is a point of time when an instruction to take a plane image is inputted by user operation, and the first point or points of time are a point or points of time before the second point of time.

7. The imaging device according to claim 6, further comprising
a difference calculation unit configured to calculate a difference between each of a plurality of pairs of viewpoint images outputted from the imaging unit at the plurality of first points of time and a pair of viewpoint images outputted from the imaging unit at the second point of time, wherein
the parallax information calculation unit calculates parallax information based on, among the plurality of pairs of viewpoint images outputted from the imaging unit at the plurality of first points of time, the pair of viewpoint images having a smallest difference calculated by the difference calculation unit.

8. The imaging device according to claim 7, wherein the difference includes a motion vector.

9. The imaging device according to claim 1, wherein
the second point of time is a point of time when an instruction to take a plane image is inputted by user operation, and the first point or points of time are a point or points of time after the second point of time.

10. The imaging device according to claim 1, wherein
the diaphragm control unit is capable of executing second diaphragm control that controls an open amount of the diaphragm unit so as to decrease parallax between corresponding points of the pair of viewpoint images outputted from the imaging unit at the second point of time.

11. An imaging method performed by an imaging device including: a single imaging optical system; an imaging unit capable of continuously outputting a pair of viewpoint images made up of a first image and a second image, by pupil-dividing subject images that have passed through first and second different areas in predetermined directions of the imaging optical system, and forming the respective subject images on two photoelectric conversion element groups to photoelectrically convert the respective subject images; and a diaphragm unit capable of adjusting an amount of luminous flux which forms images on the photoelectric conversion element groups of the imaging unit, the imaging method comprising:
a step of executing first diaphragm control that controls an open amount of the diaphragm unit so as to acquire parallax between corresponding points of the pair of viewpoint images outputted from the imaging unit at one arbitrary first point of time or a plurality of arbitrary first points of time, while executing second diaphragm control that controls the open amount of the diaphragm unit so as to be smaller than the open amount obtained by the first diaphragm control at an arbitrary second point of time that is temporally before or after the first point or points of time;
a step of controlling the imaging unit so as to output the pair of viewpoint images at the first point or points of time and the second point of time;
a step of calculating parallax information based on the pair of viewpoint images outputted from the imaging unit at the first point or points of time;
a step of generating a plane image based on the pair of viewpoint images outputted from the imaging unit at the second point of time; and
a step of determining target pixels in the plane image which are to be subjected to blurring processing, based on the calculated parallax information, and performing blurring processing on the determined, target pixels in the plane image, wherein
the parallax information includes distance information of respective pixels, and
the step of determining target pixels determines, as the target pixels of the plane image which are to be subjected to the blurring processing, distant view pixels, distance information of which is larger than a first specified distance and/or close view pixels, distance information of which is smaller than a second specified distance, and performs the blurring processing on the target pixels.

* * * * *